UNITED STATES PATENT OFFICE 2,525,681

5,5-BIS(HYDROXYMETHYL)-2-TRICHLOROMETHYL-m-DIOXANE

Harry Jones, Rochdale, and John Kempton Aiken, Sale, England, assignors to The Geigy Company Limited, Manchester, England, a British company No Drawing. Application April 7, 1948, Serial No. 19,643. In England April 10, 1947

3 Claims. (Cl. 260—338)

This invention concerns improvements in and relating to a cyclic acetal of pentaerythritol of the following formula:

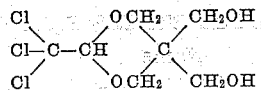

and its derivatives. The systematic chemical name for this compound is 5:5-bis(hydroxymethyl) 2-trichloromethyldioxan 1:3, but for the sake of brevity and convenience we prefer to term it "pentaerythritol monochloral."

It it known that if pentaerythritol is allowed to react with an excess of chloral in the presence of sulphuric acid, a bi-cyclic acetal is formed having the constitution:

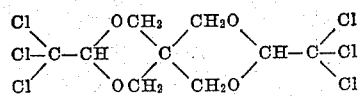

One object of the present invention is to provide an intermediate for the production of plasticisers. Another object is to provide plasticisers for cellulose triacetate. A further object is to provide products which are of use as or in synthetic coatings.

We have found that pentaerythritol monochloral can be prepared by heating together substantially equimolecular proportions of pentaerythritol and chloral in the presence of a condensing agent.

The condensing agent may be, for example, concentrated sulphuric acid and if this is used the yield may be of the order of 50%.

The mono-cyclic acetal, i. e. pentaerythritol monochloral, is a white crystalline, non-volatile, very stable solid, soluble in hot water and in chlorinated hydrocarbons, alcohols, and ketones. The presence in its molecule of chlorine atoms, hydroxyl groups, and the 1:3 dioxan ring confers upon it an unusually wide range of miscibility; and the fact that it is a di-primary alcohol renders easy the formation of such derivatives as esters, in which process the non-volatility of the parent compound, in comparison with commonly-known aliphatic alcohols and glycols, is also an advantage.

The esters of pentaerythritol monochloral are found to possess many of the miscibility characteristics of the parent compound. This parent compound is therefore potentially a valuable intermediate for the production of plasticisers. Thus for example, the diacetate of pentaerythritol monochloral has a pronounced gelling action upon cellulose triacetate, which is known to be insoluble in the majority of commonly available plasticisers.

By esterification of both the free hydroxyl groups of pentaerythritol monochloral with resin or higher fatty acids, products are obtained which are of use as or in synthetic coatings, and by esterification with polycarboxylic acids, polyesters may be obtained which can be used as modifying agents in nitrocellulose lacquers, or as "alkyd" resins or as ingredients in alkyd resins for various purposes.

The invention is illustrated but not limited by the following examples in which all parts are parts by weight.

Example 1

138 parts of crude pentaerythritol are mixed with 120 parts of chloral and heated under reflux at 100° C. until a homogeneous syrup is obtained. 130 parts of concentrated sulphuric acid are then added slowly with stirring and heating at 100° C. is continued for a further two hours. The product is extracted with six lots of 500 parts of boiling water, leaving a residue of the di-cyclic acetal of chloral with pentaerythritol, i. e. pentaerythritol dichloral. The aqueous extracts are united and evaporated to about one-sixth of their bulk, on which a crystalline precipitate of pentaerythritol monochloral is obtained. This may be recrystallised from hot water and dried at 100° C. to give a white powder of melting point 186-7° C. Yield of the crude product, approximately 50% of theory.

Example 2

50 parts of pentaerythritol monochloral prepared as in Example 1 are heated under reflux with 100 parts of acetic anhydride and 20 parts of fused sodium acetate for two hours at 100° C. The product is thoroughly washed with water and dried at room temperature. 60 parts (about 90% of theory) of the diacetate of pentaerythritol monochloral are obtained as a waxy solid of melting point 83° C. which gels cellulose triacetate on heating.

Example 3

72 parts of pentaerythritol monochloral prepared as in Example 1 are heated with 50 parts of sebacic acid in an atmosphere of nitrogen with thorough stirring at 140° C. for six hours, or until the product has an acid value of less than 20. The product, poly-pentaerythritol monochloral sebacate, is a brown, highly viscous syrup which is compatible with cellulose nitrate.

Example 4

38 parts of pentaerythritol monochloral prepared as in Example 1 are heated with 70 parts of linseed oil fatty acids with thorough stirring in an atmosphere of nitrogen at 150° C. for six hours, or until the product has an acid value of less than 10. The product is a clear, light brown oil which, on stoving at 100° C. with 0.1% cobalt added as naphthenate, yields a clear, tough, flexible and water-resistant film.

Example 5

A solution is made of 7 parts of cellulose nitrate (medium viscosity) damped with 3 parts of butanol in 30 parts of acetone: to this is added a solution of 5 parts of poly-pentaerythritol monochloral sebacate, prepared as in Example 3, in 30 parts of butyl acetate, and the mixture is thinned with up to 20 parts of benzene according to the consistency required. The resulting lacquer gives well flowed-out films of good gloss and flexibility.

Example 6

A solution is made by ball-milling 2 parts of cellulose triacetate with 10 parts of cyclopentanone and 0.5 part of pentaerythritol monochloral diacetate prepared as in Example 2, 10 parts of acetone being gradually added during the process. After clarification, for example, by filtration, sedimentation, or centrifuging, the resulting lacquer gives clear, tough films of excellent heat- and water-resistance.

We declare that what we claim is:

1. Pentaerythritol monochloral of the formula

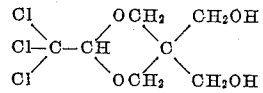

2. A process for the preparation of pentaerythritol monochloral which comprises heating together substantially equimolecular proportions of pentaerythritol and chloral in the presence of a condensing agent.

3. A process as claimed in claim 2 in which the condensing agent is concentrated sulphuric acid.

HARRY JONES.
JOHN KEMPTON AIKEN.

REFERENCES CITED

The following references are of record in the file of this patent:

UNITED STATES PATENTS

| Number | Name | Date |
|---|---|---|
| 1,934,309 | Hoover | Nov. 7, 1933 |
| 2,065,125 | Dreyfus | Dec. 22, 1936 |
| 2,245,260 | Dickey et al. | June 10, 1941 |
| 2,421,569 | La Forge | June 3, 1947 |
| 2,446,257 | Barth | Aug. 3, 1948 |